March 21, 1933.   R. C. SANDERS   1,902,667
ACCELERATOR PEDAL
Filed July 22, 1931
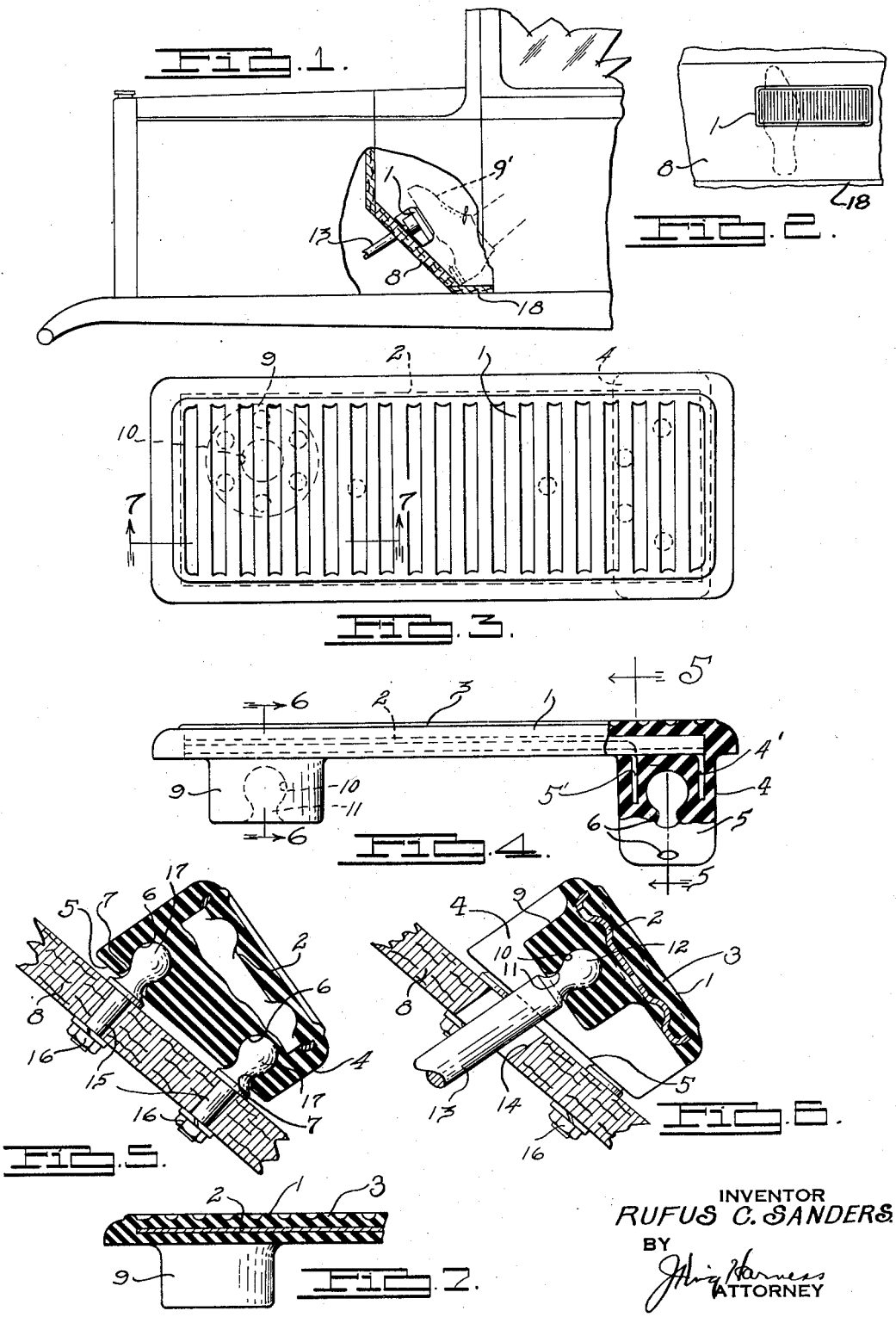
INVENTOR
RUFUS C. SANDERS
BY
ATTORNEY Patented Mar. 21, 1933

1,902,667

UNITED STATES PATENT OFFICE

RUFUS C. SANDERS, OF DETROIT, MICHIGAN, ASSIGNOR TO CHRYSLER CORPORATION, OF DETROIT, MICHIGAN, A CORPORATION OF DELAWARE

ACCELERATOR PEDAL

Application filed July 22, 1931. Serial No. 552,315.

This invention relates to an improved accelerator pedal and arrangement thereof on a vehicle toe riser or other supporting structure.

The main objects of the invention are to provide an accelerator pedal which serves as a foot rest; to provide a pedal of this kind which is arranged so as to be operable by a forward rocking action of an operator's foot and by a sidewise tilting movement of the operator's foot, or by a combination of such foot movements; to provide an accelerator pedal of this character which is tiltable about an axis that extends transversely of a toe riser of a vehicle; and to provide an improved accelerator pedal which is adapted to be positioned in spaced relation to the floor of the vehicle with its length extending diagonally of the length of a toe riser so as to obviate obstruction of the space immediately above the floor engaging portion of the toe riser through which the driver's feet normally pass in entering the driver's seat from the right door of the vehicle.

Further objects of the invention are to provide improved means for tiltably supporting an accelerator pedal on the toe riser of a vehicle; to provide means of this character which coact resiliently with each other so as to tiltably hold the pedal in place; and to provide a rubber base portion on the pedal having constricted sockets for receiving the fastening elements.

An illustrative embodiment of the invention is shown in the accompanying drawing, in which:

Fig. 1 is a fragmentary side elevation of a vehicle showing a portion of the body part removed to disclose the arrangement of my improved accelerator pedal.

Fig. 2 is a fragmentary plan view of the toe riser of the vehicle illustrating one position in which my improved accelerator pedal may be advantageously employed.

Fig. 3 is a top plan view showing a substantially full sized illustration of the pedal.

Fig. 4 is a side elevation of the pedal shown in Fig. 3.

Fig. 5 is a vertical section taken on the line 5—5 of Fig. 4.

Fig. 6 is a vertical section taken on the line 6—6 of Fig. 4.

Fig. 7 is a fragmentary longitudinal section taken on the line 7—7 of Fig. 3.

In the form shown, my improved accelerator pedal includes a tread portion 1 which is substantially rectangular in shape having an inner metal core structure 2 and an outer rubber coating 3. The coating 3 is integrally bonded by vulcanization to the metal core structure 2. Integrally formed on one end of the tread 1 is a substantially solid rubber lug 4 which extends substantially across the entire width of the tread. Spaced depending flanges 4' and 5' are struck downwardly from the extremity and adjacent body portion of the metal reinforcing core 2 respectively and are embedded in the lug 4. This lug has an inclined lower face 5 and it is provided with spaced sockets 6 having constricted entrances 7 adjacent the lower face 5 thereof. The lower face 5 of the lug is inclined sufficiently with respect to the plane of the tread portion 1 to retain the pedal at an inclination to the toe riser 8 which permits the driver's foot, illustrated in dotted lines at 9' in Fig. 1, to assume a comfortable position with the heel resting upon the toe riser.

The other end portion of the pedal is provided with a rubber lug 9 in which is formed a socket or recess 10 having a restricted entrance 11 which is adapted to receive a ball-shaped knob 12 on the upper end of an accelerator control rod 13 that extends through an aperture 14 in the toe riser 8. The ball-shaped knob 12 is larger in size than the relaxed dimensions of the socket 10 and therefore the knob 12 is releasably gripped by the rubber structure of the lug 9.

The accelerator pedal is detachably mounted on the toe riser 8 by transversely aligned studs or supports 15 which extend through apertures in the toe riser and which are firmly clamped thereon by nuts 16. Formed on the upper ends of the studs 15 are ball-shaped knobs 17 which are receivable in the sockets 6 of the lug 4. The sockets 6 coact with the studs in detachably supporting the pedal so that it may be rocked about a pivotal axis extending transversely of the toe riser, as illustrated in Fig. 2. The rounded ends of the studs protrude between the flanges 4' and 5' of the core 2 which resist lateral swinging of the tread part of the device with substantial rigidity.

This arrangement permits depression of the pedal by a forward rocking movement of the operator's foot, by sidewise tilting thereof, or by a combination of such foot movements. The lower extremity of the pedal is spaced from the junction of the toe-board and floor 18 so as to prevent obstruction of the space immediately above the floor through which the driver's feet ordinarily pass when entering the driver's seat from the right hand door of the vehicle.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. An accelerator pedal including a tread portion having rigid sheet-like elements protruding from one side thereof, a lug enveloping said protruding rigid elements comprising resilient material and having a pair of sockets therein between said elements, the entrances to said sockets being yieldably restricted by the resilient material of said lug, and a pair of members, each securable at one end to a supporting structure and each having a knob slightly larger than the relaxed dimensions of said sockets, said knobs being receivable in said sockets for tiltably supporting said pedal.

2. An accelerator pedal including a tread portion having rigid sheet-like elements protruding from one side of and extending laterally of said tread portion, a lug enveloping said protruding elements comprising resilient material and having a pair of sockets therein spaced apart laterally of said tread portion, the entrances to said sockets being yieldably restricted by the resilient material of said lug, a pair of members, each securable at one end to a supporting structure and each having a knob slightly larger than the relaxed dimensions of said sockets, said knobs being receivable in said sockets for tiltably supporting said pedal, and a lug on said tread portion comprising yieldable material and having a constructed socket for receiving an end of a control rod.

3. In a vehicle including a toe riser and having an accelerator control rod extending therethrough, a pair of transversely aligned supports fixed on said toe riser, each having a ball-shaped upwardly extending knob, and an accelerator pedal arranged transversely of said toe board including a rubber lug having sockets for receiving said knobs and having spaced reinforcing elements embedded therein and located on opposite sides of said sockets for confining pivotal movement of said pedal substantially about an axis extending transversely of said toe riser.

4. In a vehicle including a toe riser and having an accelerator control rod extending therethrough, a pair of transversely aligned supports fixed on said toe riser, each having a ball-shaped upwardly extending knob, an accelerator pedal arranged transversely of said toe board including a metal core having spaced integral flanges on one end portion extending downwardly from one side of said metal core, and a rubber lug on said end portion enveloping said flanges and having sockets between the latter spaced apart laterally of said pedal for receiving said knobs.

5. An accelerator pedal including a tread portion having rigid sheet-like elements protruding from one side thereof, resilient material enveloping said protruding rigid elements, said material having a pair of sockets therein between said elements, the entrances to said sockets being yieldably restricted by the resilient material, and a pair of members, each securable at one end to a supporting structure and each having a knob slightly larger than the relaxed dimensions of said sockets, said knobs being received in said sockets for tiltably supporting said pedal.

6. An accelerator pedal including a tread portion having rigid sheet-like elements protruding from one side thereof, resilient material enveloping said protruding rigid elements, said material having a pair of sockets therein between said elements, and a pair of members, each securable at one end to a supporting structure, the other ends of said members being receivable in said sockets for tiltably supporting said pedal, and said protruding rigid members resisting twisting movement of the tread portion of said pedal.

7. An accelerator pedal including a tread portion having a rigid sheet-like element protruding from one side thereof, resilient material enveloping said protruding rigid element, said material having a pair of sockets therein adjacent one side of said rigid element extending from the outer extremity of said enveloping resilient material to a position intermediate said tread portion and the extremity of said rigid element remote from said tread portion, and a pair of members, each securable at one end to a supporting structure and each having a knob slightly larger than the relaxed dimensions of said sockets, said knobs being received in said sockets for tiltably supporting said pedal.

RUFUS C. SANDERS.